(12) United States Patent
Seiver (10) Patent No.: US 7,388,303 B2
(45) Date of Patent: Jun. 17, 2008

(54) STAND-ALONE ELECTRICAL SYSTEM FOR LARGE MOTOR LOADS

(75) Inventor: John R. Seiver, League City, TX (US)

(73) Assignee: Conocophillips Company, Houston, TX (US)

( * ) Notice: Subject to any disclaimer, the term of this patent is extended or adjusted under 35 U.S.C. 154(b) by 616 days.

(21) Appl. No.: 10/724,907

(22) Filed: Dec. 1, 2003

(65) Prior Publication Data
US 2005/0116541 A1   Jun. 2, 2005

(51) Int. Cl.
*H02G 5/06* (2006.01)
*H01B 9/06* (2006.01)
*F25J 1/02* (2006.01)
*H02J 3/46* (2006.01)

(52) U.S. Cl. ............... 307/19; 174/70 B; 174/71 B; 174/72 B; 62/611; 62/612; 307/20; 307/69; 700/291

(58) Field of Classification Search ............ 174/70 B, 174/71 B, 72 B, 99 B; 307/19, 20, 69; 700/291; 62/611, 612
See application file for complete search history.

(56) References Cited

U.S. PATENT DOCUMENTS

| | | | | |
|---|---|---|---|---|
| 4,093,968 A | | 6/1978 | Shirey | 361/58 |
| 4,342,978 A | | 8/1982 | Meister | 337/6 |
| 4,467,220 A | * | 8/1984 | Page | 307/19 |
| 5,422,517 A | * | 6/1995 | Verney et al. | 307/29 |
| 7,079,367 B1 | * | 7/2006 | Liljestrand | 361/62 |
| 7,114,351 B2 | * | 10/2006 | Jones et al. | 62/611 |
| 2004/0245857 A1 | * | 12/2004 | Liljestrand et al. | 307/143 |
| 2005/0073200 A1 | * | 4/2005 | Divan et al. | 307/44 |
| 2005/0099746 A1 | * | 5/2005 | Vergnat et al. | 361/62 |

FOREIGN PATENT DOCUMENTS

| | | | |
|---|---|---|---|
| WO | WO98/09359 | | 3/1998 |
| WO | WO 9858435 A1 | * | 12/1998 |
| WO | WO01/33685 | | 5/2001 |
| WO | WO02/056326 | | 7/2002 |

OTHER PUBLICATIONS

"MiniFlux Isolated Phase Bus Duct", General Electric, http://www.geindustrial.com/cwc/products?pnlid=5&famid=6&catid=26&id=isophase&lang=en_US, 1997.*

Irwin, J. David. "Kirchhoff's Law", Basic Engineering Circuit Analysis, Sectoin 2.2, pp. 27-31, 1996.*

* cited by examiner

*Primary Examiner*—Stephen W Jackson
*Assistant Examiner*—Hal I. Kaplan
(74) *Attorney, Agent, or Firm*—Hovey Williams LLP (57) ABSTRACT

An electrical power system that can be used to interconnect a plurality of generators to a plurality to loads while being rated at less than a total power consumed. The system is preferably used to distribute power for a Liquefied Natural Gas (LNG) facility. The system broadly comprises a primary bus connected between the generators and the loads, such as electrical compressor motors used in the LNG facility. The generators and the loads are arranged along the primary bus in order to distribute the power from the generators to the loads, without overloading the primary bus.

33 Claims, 11 Drawing Sheets

STAND-ALONE ELECTRICAL SYSTEM FOR LARGE MOTOR LOADS

BACKGROUND OF THE INVENTION

1. Field of the Invention

The present invention relates to electrical power systems. More particularly, the present invention relates to an electrical power system that can be used to interconnect a plurality of generators to a plurality of loads while being rated at less than a total power consumed.

2. Description of Prior Art

Power distribution buses are commonly used to distribute power from sources, such as generators and/or electrical power providers, to electrical loads. As a total power consumed is increased, a rating of a distribution bus must also be increased. In other words, bus ratings must be increased to handle an increase in total power consumed flowing through a bus.

However, there are practical limits on rating increases for conventional buses. For example, skin effect limits a bus bar's current carrying capacity. Additionally, components for higher rated buses are very expensive and occupy a large space. Therefore, it is not always practical to simply increase a rating of a bus.

One prior art solution is to use a lower rated bus and then use step-up and step-down transformers to reduce a current flow through the bus. For example, power can be generated at a generation voltage and a generation current. A step-up transformer may be used to increase the generation voltage to a distribution voltage, thereby decreasing the generation current to a distribution current. A distribution bus then carries the distribution current to a step-down transformer, which decreases the distribution voltage to a motor voltage, thereby increasing the distribution current to a motor current. In this case, the distribution bus need only be rated to handle the distribution current. However, this further complicates a power system by adding components, with their associated costs and space requirements. This problem is especially troublesome where the generation voltage can be made equal to the motor voltage, since the transformers would otherwise be superfluous.

Accordingly, there is a need for an improved electrical power system that overcomes the limitations of the prior art.

SUMMARY OF THE INVENTION

The present invention overcomes the above-identified problems and provides a distinct advance in the art of electrical power systems. More particularly, the present invention provides an electrical power system that can be used to interconnect a plurality of generators to a plurality of loads while being rated at less than a total power consumed. The system is preferably used to distribute power for a Liquified Natural Gas (LNG) facility. The system broadly comprises a primary bus connected between the generators and the loads, which preferably includes electrical compressor motors used in the LNG facility. The generators are preferably completely conventional gas turbine generators of the type currently used in typical LNG facilities. However, as discussed in further detail below, the generators used with the system of the present invention may be smaller than those that might otherwise be required. Similarly, the motors and the other loads are preferably completely conventional and of the type currently used in typical LNG facilities. The total power consumed is essentially a summation of the power that each of the loads of the LNG facility may consume under heavy use.

Simply put, the generators and the loads are arranged along the primary bus in order to distribute the power from the generators to the loads, without overloading the primary bus. The primary bus includes a plurality of input points in order to receive the power along the primary bus such that the total power consumed does not flow into any one point of the primary bus. The primary bus also includes as many output points as are necessary, depending upon the number of loads of the LNG facility.

The motors are expected to be the largest loads of the LNG facility. With this in mind, each generator is preferably sized to provide power for between one and two of the motors. A quantity of generators is preferably determined by an engineer according to characteristics of the generators and the loads. In addition, the quantity of generators preferably includes at least one more generator than that required by the total power consumed in order to accommodate maintenance or tripping of any of the generators. This advantageously allows the system to be used with smaller generators, rather than relying on larger, more expensive, and more difficult to maintain generators. Similarly, the primary bus preferably has a rating sufficient to handle the power requirements of between one and two of the motors.

A catastrophic failure, such as a short-circuit, would likely cause extremely high current flow toward the short-circuit. Therefore, a plurality of short-circuit current limiters (ISCL) are preferably strategically placed along the primary bus between the generators. The ISCLs essentially operate as fuses and quickly produce an open circuit once a current limit is reached, thereby isolating one portion of the primary bus from another portion. In this manner, the ISCLs divide the primary bus into a plurality of sub-buses, at the onset of the short circuit. The sub-buses allow any unaffected generators, motors, and other loads to continue operation, while only an affected generator and load trip due to the short-circuit, rather than shutting down the entire LNG facility.

The system may also incorporate a special-use bus connected to the primary bus through one or more variable frequency drives (VFD). For example, one or more of the motors may be disconnected from the primary bus and connected to the special-use bus. Then, that motor may be slowly ramped up using the VFD. Once that motor is synchronized with the primary bus, that motor may be re-connected to the primary bus. In this manner, the special-use bus may be used to start the motors with minimal impact on the primary bus and the rest of the LNG facility.

Similarly, the primary bus may be configured in parallel with a secondary bus. In this case, the generators may be divided between the buses and the loads may be connected to both buses. Alternatively, fewer generators may also be used and connected to both buses. In this manner, the buses share the total power consumed, thereby allowing each of the buses to be of an even smaller rating.

Thus, by distributing the generators and the loads along the primary bus, lesser rated generators and bus components may be used, thereby overcoming the problems of the prior art. Specifically, the system of the present invention overcomes the limitations of the primary bus' current carrying capacity while generating the power at a voltage level required by the loads, thereby not requiring the use of costly transformers.

In use, an engineer or other user wishing to implement the invention must first sum all of the loads to establish the total power consumed. The engineer must also calculate the quantity of generators required to provide the total power consumed. The engineer will almost certainly want to add one or more generators to the quantity, in order to accommodate one or more of the generators being shut-down without impacting the rest of the system.

Once the total power consumed and the quantity of generators is known, the engineer may select the primary bus. The primary bus is preferably selected according to the rating of the primary bus, the characteristics of the loads, and other considerations, such as cost, size, and availability. For example, the rating of the primary bus must exceed at least a largest one of the loads, such as one or more of the motors. While the rating of the primary bus may exceed two of the motors, the primary bus does not need to be rated to handle the total power consumed.

Once the primary bus has been selected, the engineer must determine where each generator and load should be placed. The engineer preferably begins by placing the generators and the loads along the primary bus in a substantially even distribution. Then, the engineer preferably uses Kirchoff's current law to determine if any point of the primary bus would be overloaded. Specifically, Kirchoff's current law states that a sum of all currents flowing into a node is equal to all currents flowing from the node. Thus, using Kirchoff's current law, the engineer may determine a current flow for each point of the primary bus. If the engineer finds that one or more points of the primary bus would be overloaded, he or she relocates one or more of the generators or the loads until no point of the primary bus is overloaded. If the engineer is unable to find a solution wherein no point of the primary bus is overloaded, the engineer may be forced to select a slightly higher rated bus and perform these calculations again.

Finally, the engineer determines where each ISCL should be placed. Each ISCL should be placed to prevent any short-circuit from exceeding a short-circuit current rating of the primary bus. For example, the generators are able to produce a specified short-circuit current. In addition, any of the motors that are running may also produce short-circuit current. Since the system includes several generators and motors, a total short-circuit current may be very high, and beyond the primary bus's momentary rating for short-circuit current. However, by placing the ISCLs along the primary bus between the generators, the engineer prevents multiple generators and motors from cooperating in response to the short-circuit. Thus, the primary bus need only be rated to handle the short-circuit current from one of the generators and one of the motors.

As discussed above, the ISCLs may break down the primary bus into several sub-buses. Thus, the engineer may also locate ISCLs with this in mind. For example, the engineer may decide to place the ISCLs around, or in series with, large loads in an effort to minimize any impact a short-circuit associated with those loads might have on the rest of the system.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
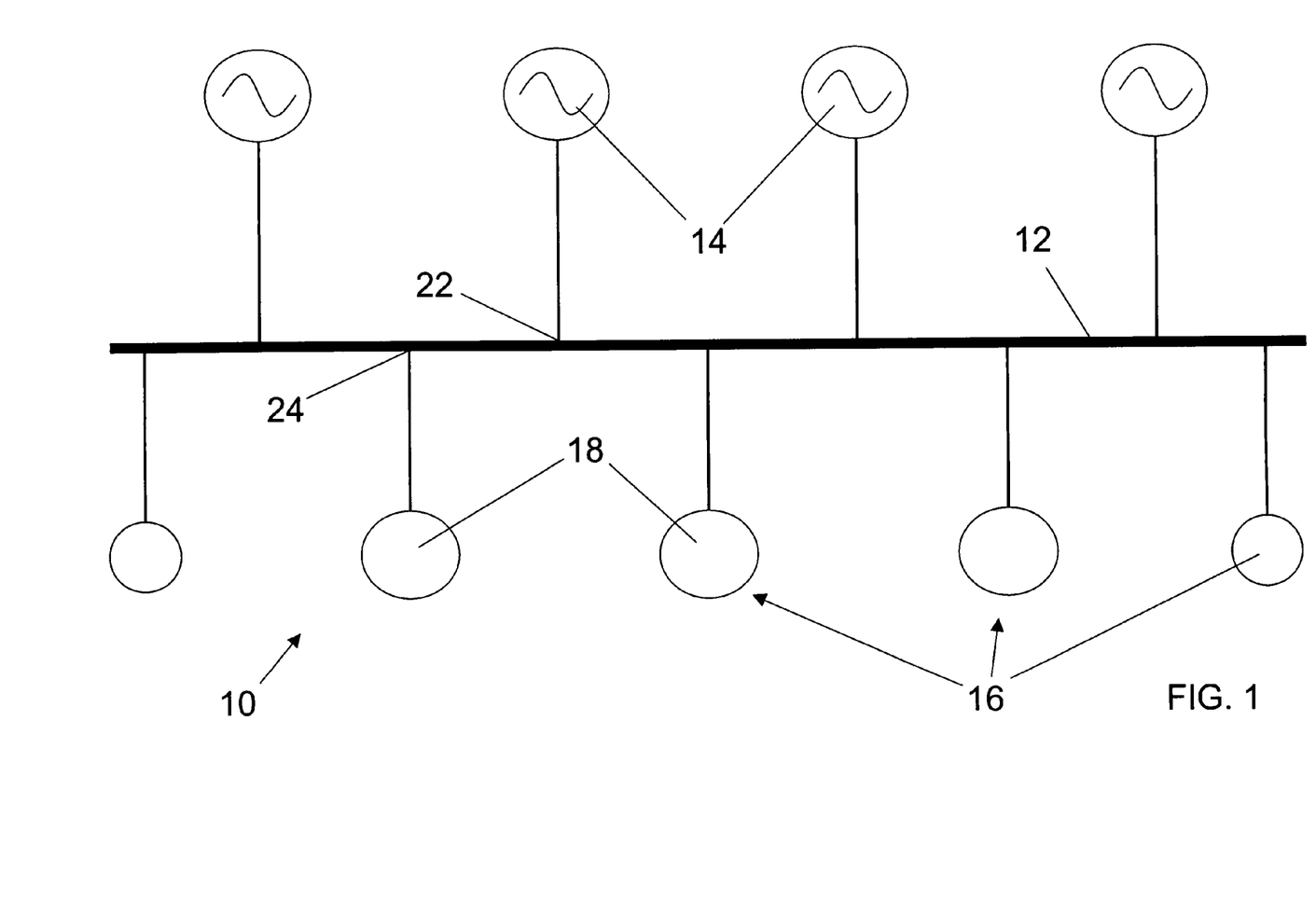
FIG. 1 is a one-line diagram of an electrical system constructed in accordance with a preferred embodiment of the present invention.

Referring to FIG. 1, the preferred electrical power system 10 constructed in accordance with a preferred embodiment of the present invention is illustrated as part of a Liquified Natural Gas (LNG) facility. Preferably, the LNG facility is a cascaded-type LNG facility employing at least one open refrigeration cycle. For example, the LNG facility may be similar to that described in U.S. patent application Ser. No. 10/286,292, the entire disclosure of which is incorporated herein by reference. The system 10 broadly comprises a primary bus 12 connected between a plurality of generators 14 and a plurality of electrical loads 16, such as electrical compressor motors 18 used in the LNG facility. The LNG facility typically uses compressors in converting natural gas from a gaseous state to a liquid state, otherwise known as LNG. As a result, the motors 18 are typically the LNG facility's biggest power consumer.

While the compressors may be driven directly by gas turbines, the compressors are preferably driven by the motors 18. Additionally, while power for the motors 18 may be purchased, the power is preferably provided by the generators 14, which are preferably driven by the gas turbines which in turn consume the natural gas, in the gaseous state. This configuration advantageously allows the LNG facility to operate independently of any electrical power provider. For example, not only can the generators 14 power the motors 18, but the generators 14 can also power all of the loads 16, such as lights, fans, and pumps. Additionally, as will be discussed in further detail below, the LNG facility may be able to sell some of the power back to the electrical power provider.

The generators 14 are preferably completely conventional gas turbine generators of the type currently used in typical LNG facilities. However, as discussed in further detail below, the generators 14 may be smaller than those that might otherwise be required. Similarly, the motors 18 and the other loads 16 are preferably completely conventional and of the type currently used in typical LNG facilities.

Each motor 18 has a specific power requirement, as do the other loads 16. All of the specific power requirements of all of the loads 16 of the LNG facility are summed to determine a total power consumed. Thus, the total power consumed is essentially a summation of the power requirements that each of the loads 16 of the LNG facility may consume under heavy use.

Simply put, the generators 14 and the loads 16 are arranged along the primary bus 12 in order to distribute the power from the generators 14 to the loads 16, without overloading the primary bus 12. The primary bus 12 is preferably similar to those commonly available, with some important differences which will be explained in detail below. For example, the primary bus 12 preferably comprises several large bars made of metal, such as copper, that carry the power from the generators 14 to the loads 16.

The primary bus 12 also includes a plurality of input points 22 in order to receive the power along the primary bus 12 such that the total power consumed does not flow into any one point of the primary bus 12. Specifically, the primary bus 12 of the present invention preferably includes at least three input points 22, or at least as many input points 22 on the primary bus 12 as generators 14. For example, where the system 10 includes four generators 14, the primary bus 12 preferably includes at least four input points 22. A quantity of generators 14 is preferably determined by an engineer according to characteristics of the generators 14 and the loads 16, as will be discussed in greater detail below. The primary bus 12 also includes as many output points 24 as are necessary, depending upon the quantity of loads 16 of the LNG facility. For example, the primary bus 12 preferably includes at least one output point 24 for each motor 18, as well as sufficient output points 24 for the other loads 16.

For the sake of simplicity, it is assumed that the generators 14 are substantially identical and the motors 18 are substantially identical. The system 10 is preferably used with three-phase alternating current. Thus, the generators 14 should be synchronized. It is also assumed that the generators 14 are perfectly balanced, such that each generator 14 provides an equal share of the total power consumed. We will also speak of power flow in terms of Mega-Volt-Amps (MVA), rather than current flow. While the primary bus 12 and components thereof are likely to be rated in terms of voltage and current, MVA can easily be related to current flow accounting for site-specific factors, such as power factor, given a fixed voltage.

As discussed above, the motors 18 are expected to be the largest loads 16 of the LNG facility. With this in mind, each generator 14 is preferably sized to provide power for at least one of the motors 18. However, the generators 14 are preferably sized below a sum of two of the motors 18. In other words, the generators 14 are preferably sized to provide power for between one and two of the motors 18. In addition, the quantity of generators 14 preferably includes at least one more generator 14 than that required by the total power consumed in order to accommodate maintenance or tripping of any of the generators 14. In this manner, loss of any one of the generators 14 has a minimal impact on the system 10. Furthermore, this advantageously allows the system 10 of the present invention to be used with smaller generators, rather than relying on larger, more expensive, and more difficult to maintain generators.

Figure 2:
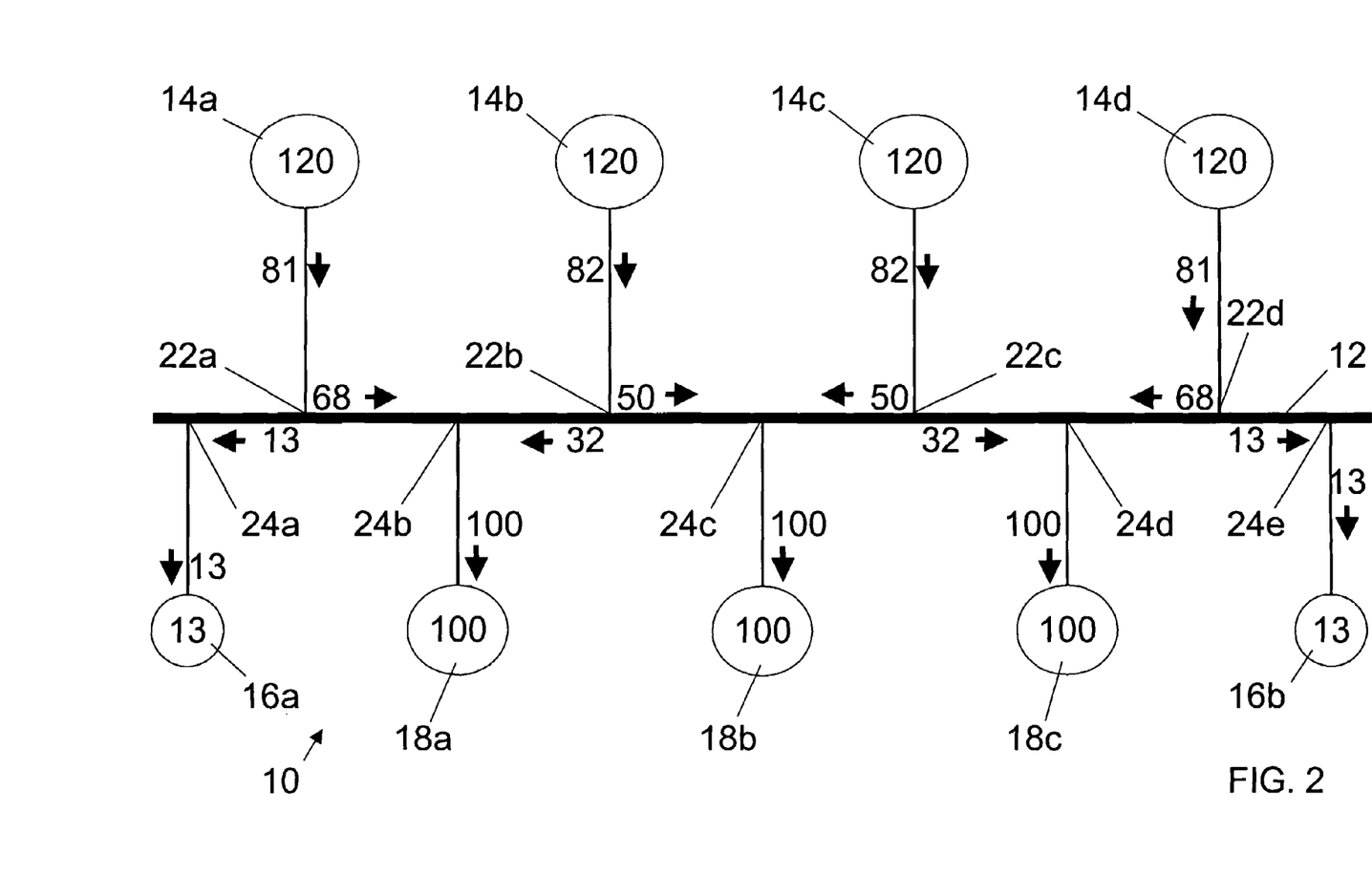
FIG. 2 is a one-line diagram of the electrical system with annotations showing normal operation.

For example, as shown in FIG. 2, suppose the system 10 includes three motors 18a, 18b, 18c, each requiring approximately 100 MVA, and two auxiliary loads 16a, 16b, each requiring approximately 13 MVA. In this case, the total power consumed is approximately 326 MVA. Further suppose that generators capable of individually providing approximately 120 MVA are to be used with the system 10. Using the aforementioned considerations, the system 10 preferably includes four generators 14a, 14b, 14c, 14d, four input points 22a, 22b, 22c, 22d, and five output points 24a, 24b, 24c, 24d, 24e.

Under normal operations, as shown in FIG. 2, each generator 14a, 14b, 14c, 14d provides approximately 82 MVA. With the given arrangement, the two outboard generators 14a, 14d each supply approximately 13 MVA to the auxiliary loads 16a, 16b, respectively, and approximately, 68 MVA to the two outboard motors 18a, 18c. Each of the two inboard generators 14b, 14c supplies approximately 32 MVA to the two outboard motors 18a, 18c, respectively, and approximately 50 MVA to the central motor 18b. In this manner, each load 16 receives the power required by that load 16 while no segment of the primary bus 12 exceeds approximately 68 MVA and no point of the primary bus 12 exceeds approximately 100 MVA, or the power requirements of each motor 18.

Figure 3:
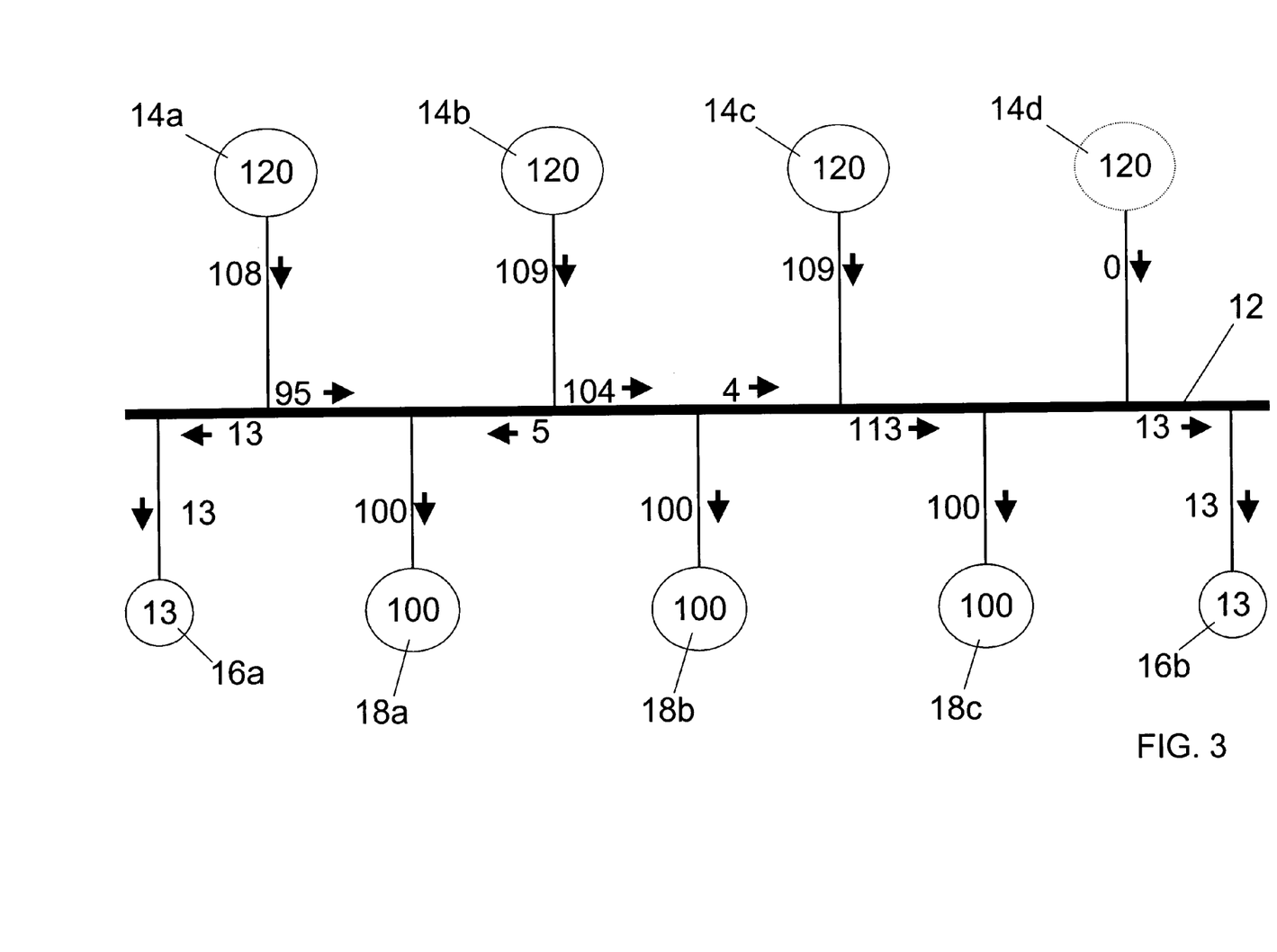
FIG. 3 is a one-line diagram of the electrical system with annotations showing abnormal operation with a first one of a plurality of generators shut-down.
Figure 4:
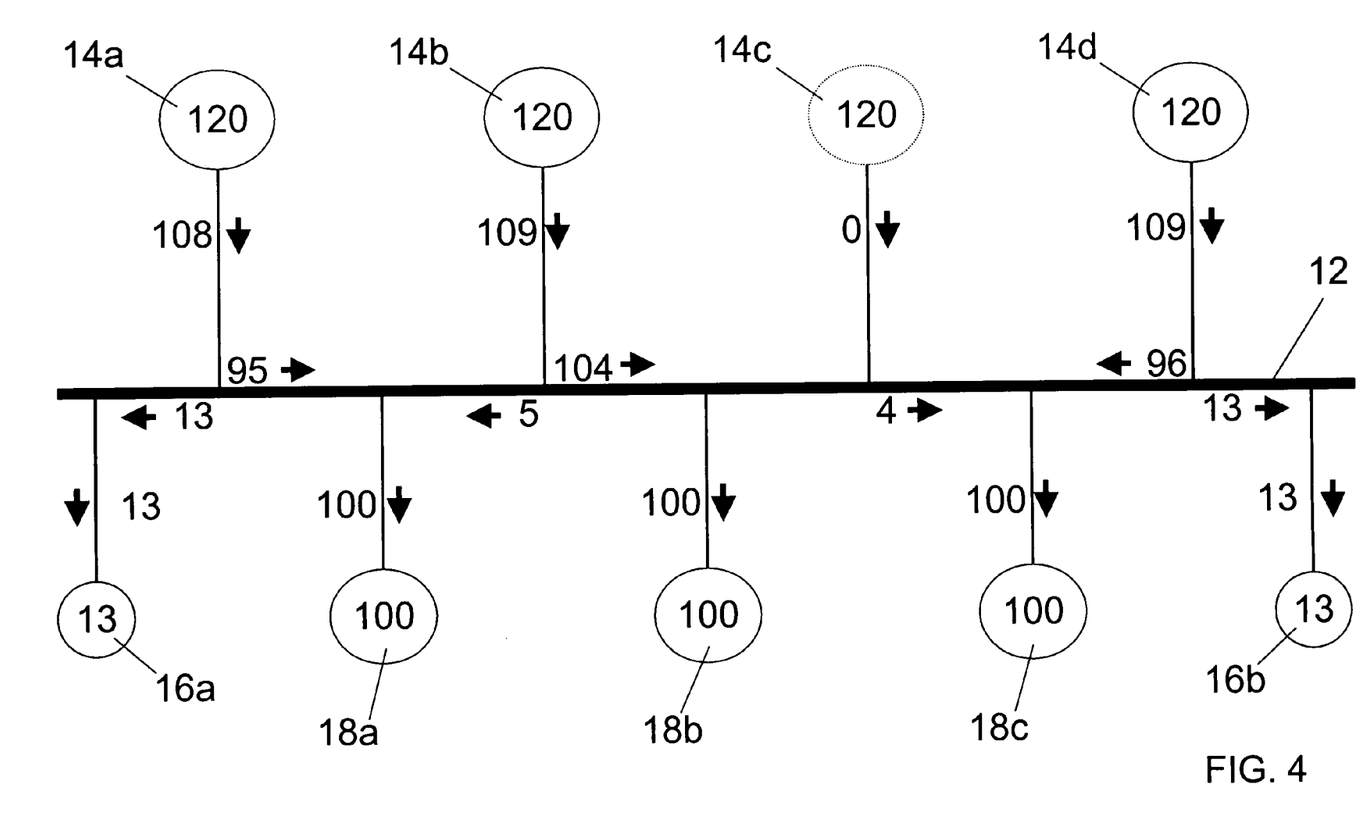
FIG. 4 is a one-line diagram of the electrical system with annotations showing abnormal operation with a second one of the plurality of generators shut-down.

As shown in FIGS. 3 and 4, the system 10 can accommodate shutting down any one of the generators 14. For example, when one of the outboard generators 14d is shut down, as shown in FIG. 3, all of the loads 16 still receive the power that they require, without overloading the primary bus 12. Specifically, no segment or point of the primary bus 12 exceeds approximately 113 MVA, while one segment experiences as little as approximately 4 MVA. Additionally, when one of the inboard generators 14c is shut down, as shown in FIG. 4, all of the loads 16 still receive the power that they require, without overloading the primary bus 12. Specifically, no segment of the primary bus 12 exceeds approximately 104 MVA and no point of the primary bus 12 exceeds approximately 109 MVA. Thus, the system 10 of the present invention accommodates the total power consumed of approximately 326 MVA while no point of the primary bus 12 is required to withstand more than approximately 113 MVA. This is so, even when any one of the generators 14 is shut down, due to either failure or maintenance.

It can be seen then, that the primary bus 12 is preferably rated to handle the power requirements of at least one of the motors 18. However, the primary bus 12 may be rated below a sum of two of the motors 18. In other words, the primary bus 12 is rated to handle the power requirements of between one and two of the motors 18.

Figure 5:
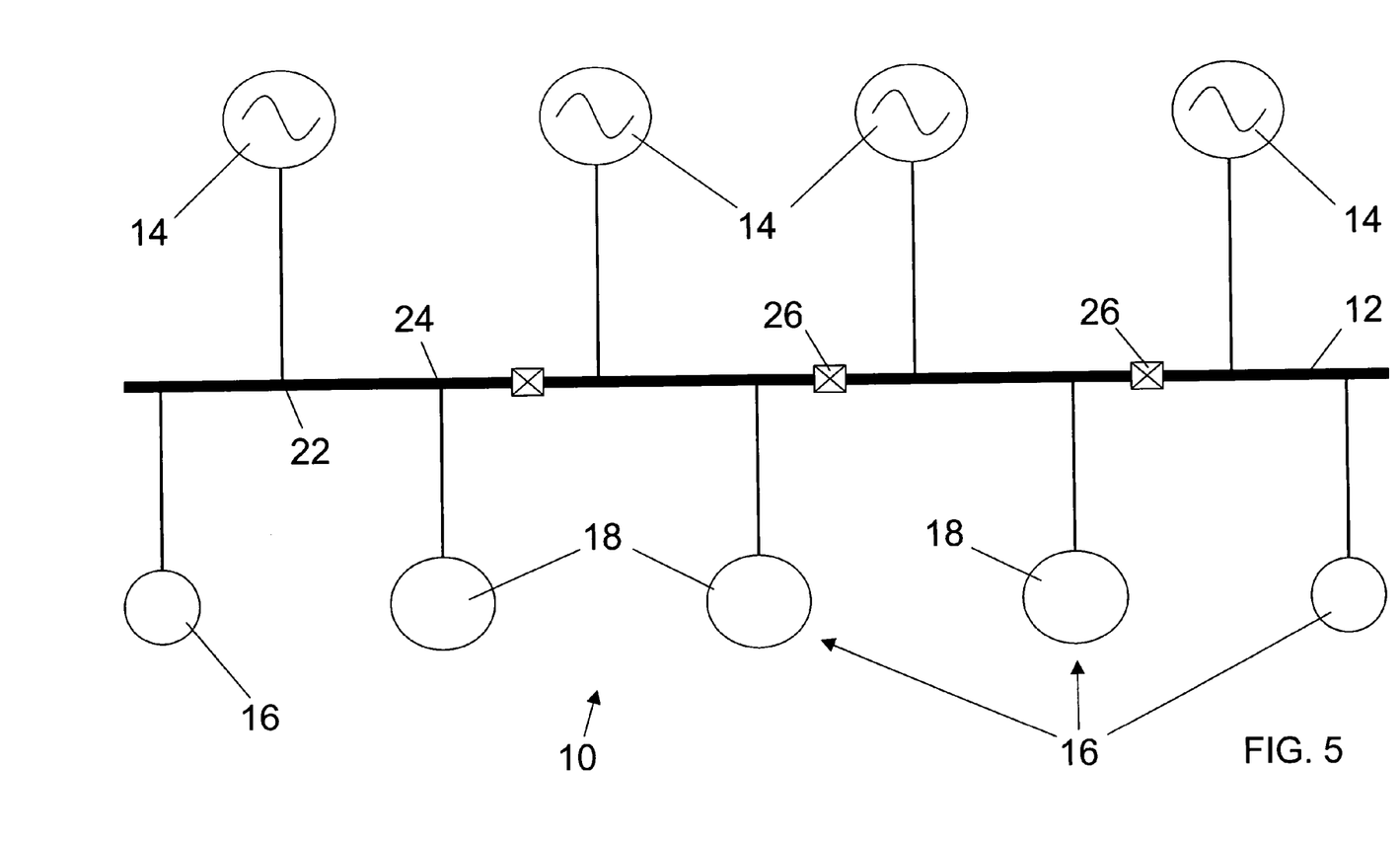
FIG. 5 is a one-line diagram of the electrical system showing a plurality of current limiters.
Figure 6:
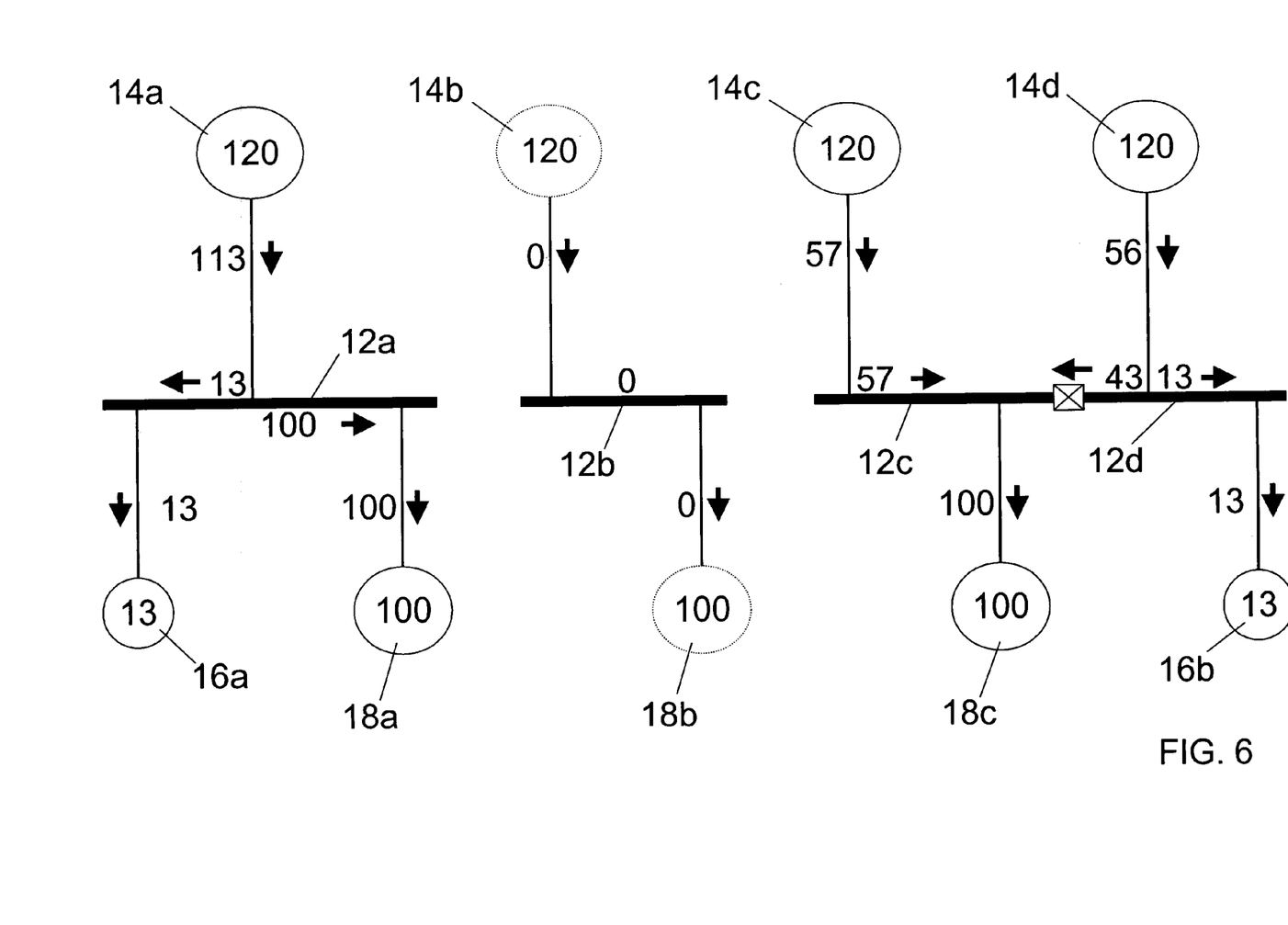
FIG. 6 is a one-line diagram of the electrical system showing with annotations showing operation after the current limiters of FIG. 5 have been activated.

A catastrophic failure, such as a short-circuit in the system 10, would likely cause extremely high current flow toward the short-circuit. Therefore, as shown in FIG. 5, a plurality of short-circuit current limiters (ISCL) 26 are preferably strategically placed along the primary bus 12 between the generators 14. The ISCLs 26 are preferably extremely fast-acting and of the explosive type available from Asea Brown Boveri, LTD (ABB). The ISCLs 26 essentially operate as fuses and quickly produce an open circuit once a current limit is reached, thereby isolating one portion of the primary bus 12 from another portion. In this manner, the ISCLs 26 divide the primary bus 12 into a plurality of sub-buses, at the onset of the short circuit. As a result, the portion of the primary bus 12 that experienced the short-circuit is isolated from the remainder of the primary bus 12 yet will not experience a short circuit in excess of that portion's rating. Thus, as shown in FIG. 6, a possible scenario in which two ISCLs 26 activated, such as might result from the short-circuit occurring on the central motor 18b, would effectively convert the primary bus 12 into three sub-buses 12a, 12b, 12c/d. The sub-buses 12a, 12b, 12c/d allow the unaffected generators 14a, 14c, 14d, motors 18a, 18c, and other loads 16a, 16b to continue operation, while only the central motor 18*b* and left inboard generator 14*b* trip due to the short-circuit, rather than shutting down the entire LNG facility.

Figure 7:
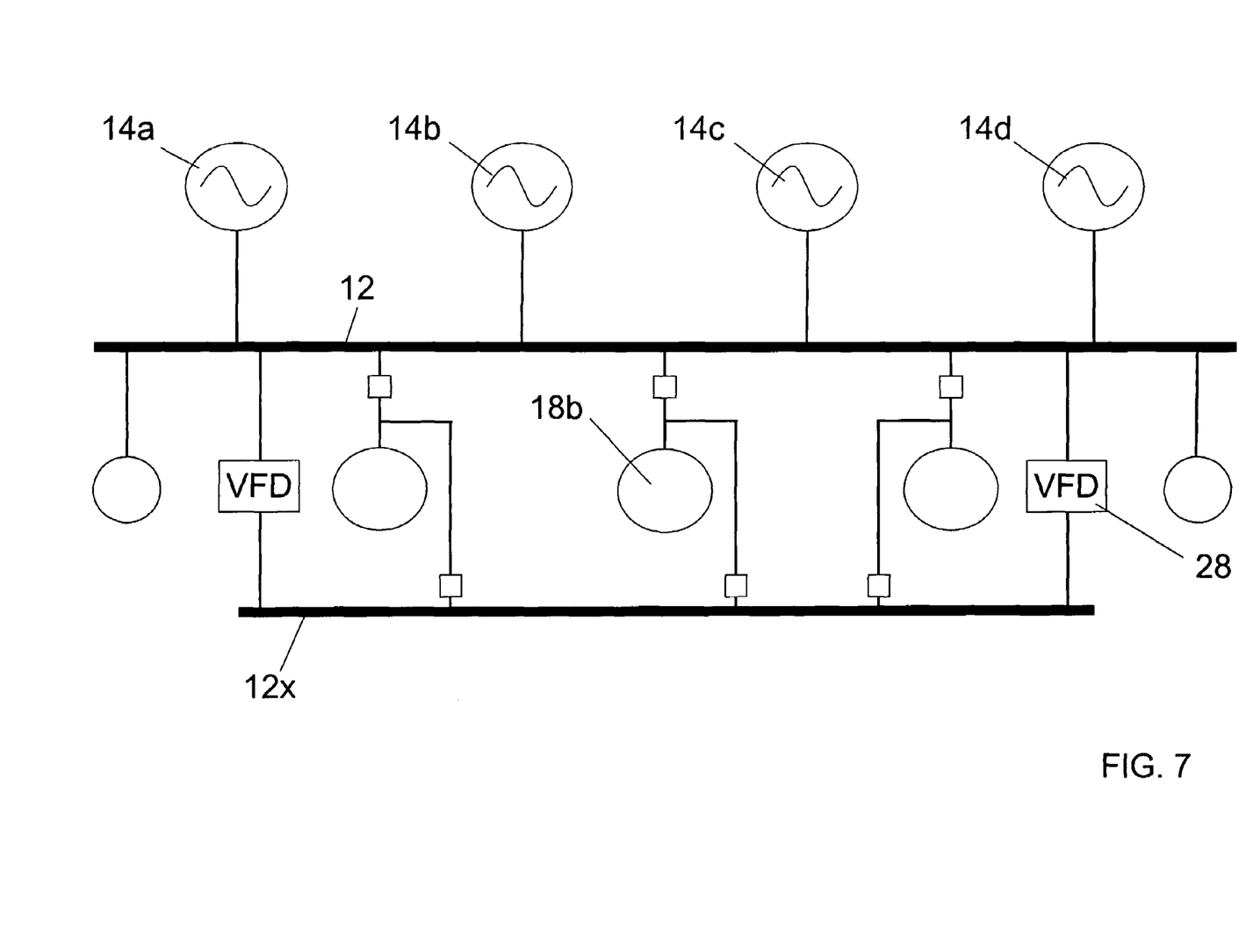
FIG. 7 is a one-line diagram of the electrical system showing a configuration having a special-use bus.
Figure 8:
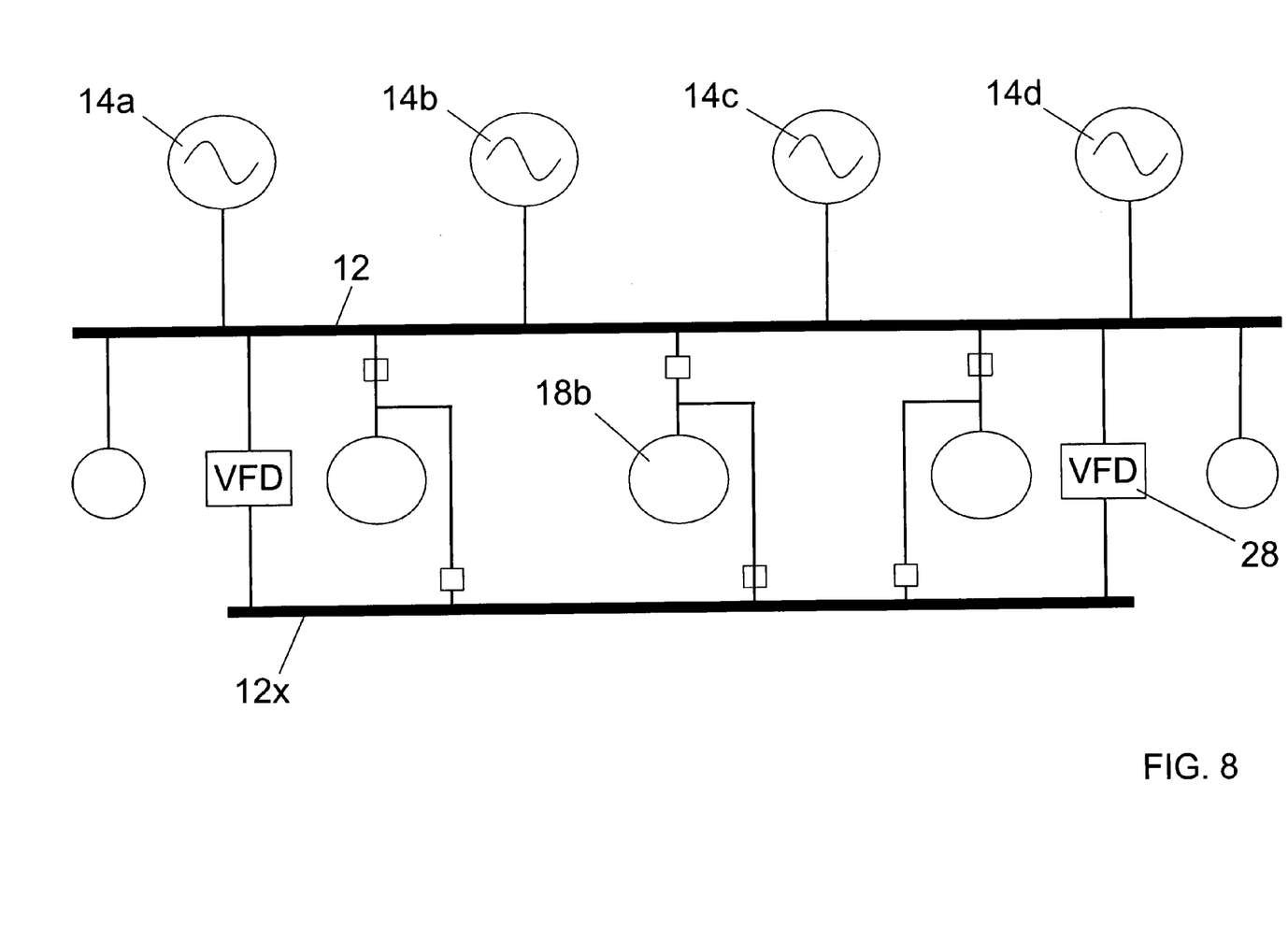
FIG. 8 is a one-line diagram of the electrical system showing operation of the special-use bus.

Referring also to FIG. 7, the system 10 may also incorporate a special-use bus 12*x*. The special-use bus 12*x* may be connected to the primary bus 12 through one or more variable frequency drives (VFD) 28. For example, as shown in FIG. 8, one or more of the motors 18*b* may be disconnected from the primary bus 12 and connected to the special-use bus 12*x*. Then, that motor 18*b* may be slowly ramped up using the VFD 28. Once that motor 18*b* is synchronized with the primary bus 12, then that motor 18*b* may be re-connected to the primary bus 12 using a conventional make-before-break switchgear. In this manner, the special-use bus 20*x* may be used to start the motors 18 with minimal impact on the primary bus 12 and the rest of the LNG facility.

Figure 9:
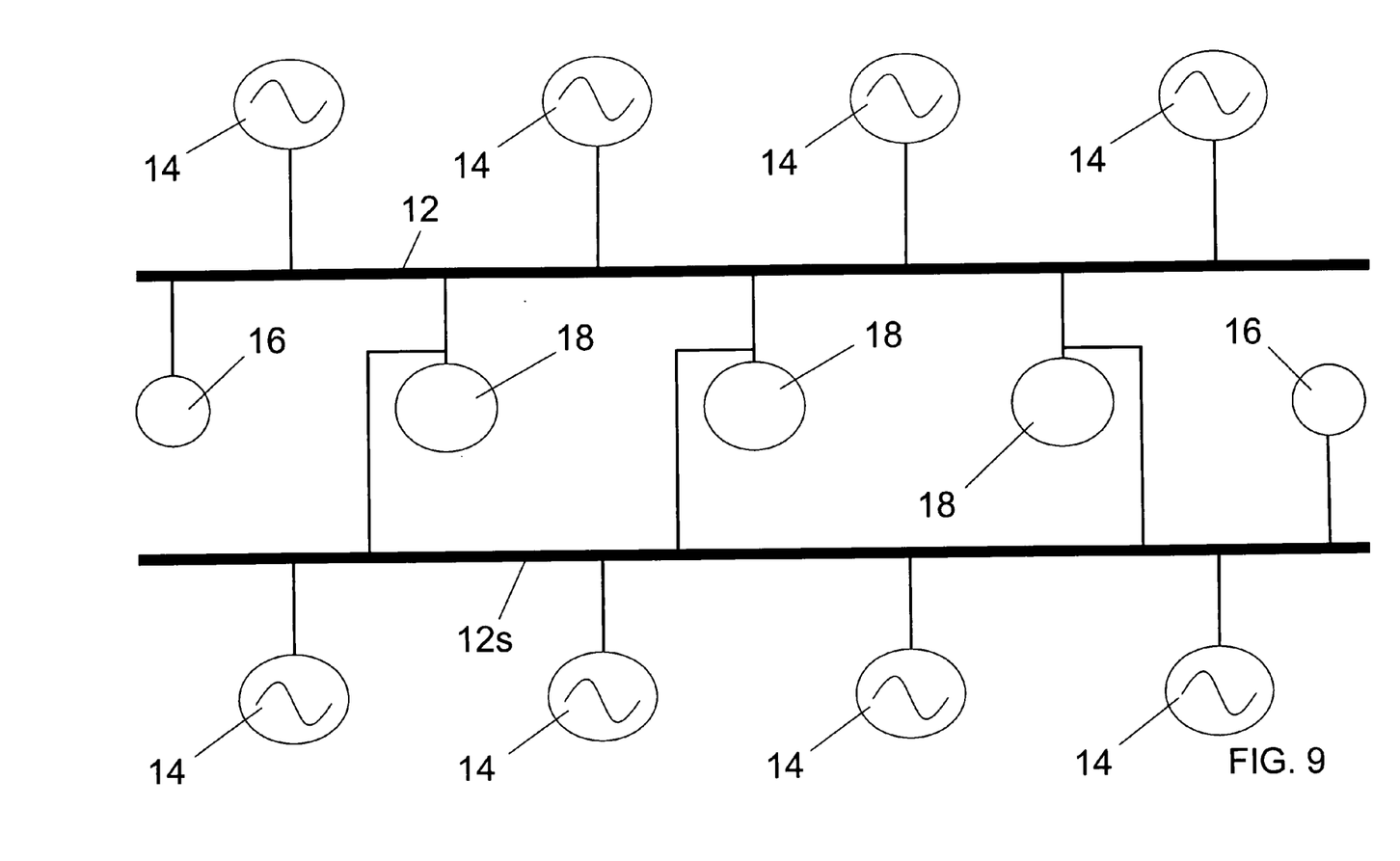
FIG. 9 is a one-line diagram of the electrical system showing a configuration having a parallel bus.

Similarly, referring also to FIG. 9, the primary bus 12 may be configured in parallel with a secondary bus 12*s*. In this case, the generators 14 may be divided between the buses 12,12*s* and the loads 16 may be connected to both buses 12,12*s*. Alternatively, fewer generators 14 maybe used and connected to both buses 12,12*s*. In this manner, the buses 12,12*s* share the total power consumed, thereby allowing each of the buses 12,12*s* to be of an even smaller rating. It should be noted that the terms primary and secondary, as used through this document, are used to differentiate between the buses 12,12*s*. Specifically, because the system 10 is not dependent upon transformers, the terms primary and secondary are not related to primary or secondary windings of a transformer. Thus, the secondary bus 12*s* simply refers to another bus which is preferably connected in parallel to the primary bus 12. The secondary bus 12*s* may be effectively tied to or separate from the primary bus 12.

It should now be apparent that by distributing the generators 14 and the loads 16 along the primary bus 12, lesser rated generators 14 and bus components may be used. Thus, the present invention advantageously overcomes the problems of the prior art. Specifically, the system 10 of the present invention overcomes the limitations of the primary bus' 12 current carrying capacity while generating the power at a voltage level required by the loads 16, thereby not requiring the use of costly transformers.

While the present invention has been described above, it is understood that substitutions and/or modifications may be made. For example, one or more of the loads 16 may represent connections to the electrical service provider. In this case, those loads 16 may be used to sell power back to the electrical service provider. Similarly, one or more of the generators 14 may represent connections to the electrical service provider. Specifically, the generators 14 may be replaced by transformers connected to the electrical service provider. In this case, the system 10 would be dependant upon the electrical service provider, but this may be a cost effective solution under some circumstances.

Additionally, any of the loads 16 may be configured to automatically shut-down upon loss of one of the generators 14, activation of one of the ISCLs 26, or any other event. Such configuration may be used to further limit the bus' 12,12*s*, 12*x* exposure to abnormally high current. The system 10 is preferably used with common distribution voltage levels, such as 2.3 Kilo Volts (KV), 4.16 KV, 12.47 KV, 13.8 KV, 25 KV, or 34.5 KV. Similarly, the system 10 preferably uses commonly available bus components, thereby resulting in the primary bus 12 having common ratings, such as 3150 Amps (A), or 5000 A. Furthermore, the system 10 may be used with larger and/or smaller generators and/or loads than those described herein. These and other minor modifications are within the scope of the present invention.

Figure 10:
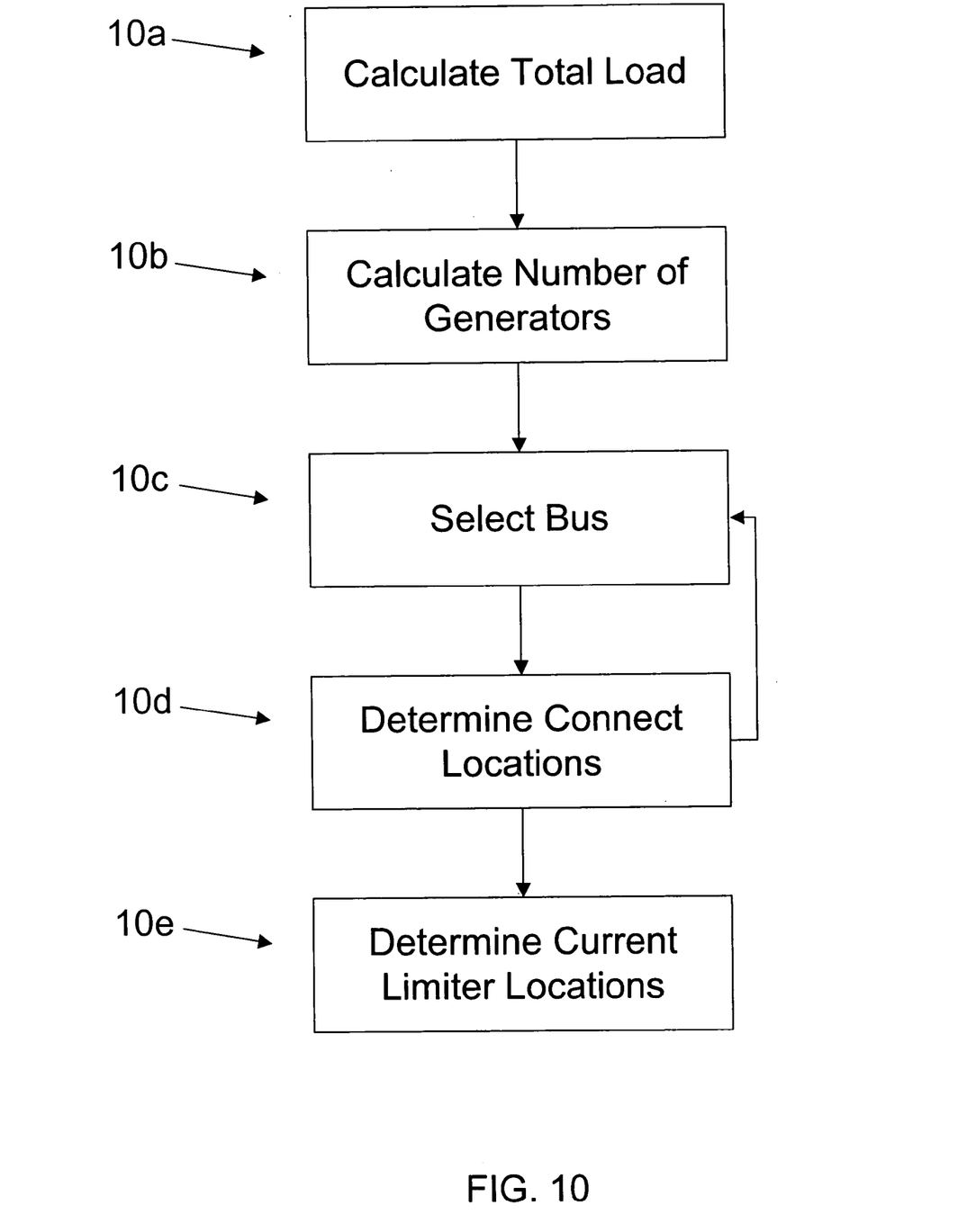
FIG. 10 is a flow chart showing a procedure for implementing the electrical system of the present invention.

The flow chart of FIG. 10 shows the functionality and operation of a preferred implementation of the present invention in more detail. In this regard, some of the blocks of the flow chart may represent a module segment or portion of code of a program of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in the reverse order depending upon the functionality involved.

Referring also to FIG. 10, the engineer or other user wishing to implement the invention must first sum all of the loads 16, to generate the total power consumed, as depicted in step 10*a*. The engineer must also calculate a quantity of generators 14 that can provide the total power consumed, as depicted in step 10*b*. The engineer will almost certainly want to add one or more generators to the quantity, in order to accommodate one or more of the generators 14 being shut-down.

Once the total power consumed and the quantity of generators 14 is known, the engineer may select the primary bus 12, as depicted in step 10*c*. The primary bus 12 is preferably selected according to the rating of the primary bus 12, the characteristics of the loads 16, and other considerations, such as cost, size, and availability, as discussed above. For example, the rating of the primary bus 12 must exceed at least a largest one of the loads 16, such as one or more of the motors 18. Additionally, the rating of the primary bus 12 may exceed two of the motors 18. However, as discussed throughout this document, the primary bus 12 does not need to be rated to handle the total power consumed.

Once the primary bus 12 has been selected, the engineer must determine where each generator 14 and load 16 should be placed, as depicted in step 10*d*. The engineer preferably begins by placing the generators 14 and the loads 16 along the primary bus 12 in a substantially even distribution. Then, the engineer preferably uses Kirchoff's current law to determine if any point 22,24 of the primary bus 12 would be overloaded. Specifically, Kirchoff's current law states that a sum of all currents flowing into a node is equal to all currents flowing from the node. Thus, using Kirchoff's current law, the engineer may determine a current flow at each point 22,24 of the primary bus 12. If the engineer finds that one or more points 22,24 of the primary bus 12 would be overloaded, he or she relocates one or more of the generators 14 or the loads 16 until no point 22,24 of the primary bus 12 is overloaded. If the engineer is unable to find a solution wherein no point of the primary bus 12 is overloaded, the engineer may be forced to select a slightly higher rated bus and perform step 10*d* again.

Finally, the engineer determines where each ISCL 26 should be placed, as depicted in step 10*e*. Each ISCL 26 should be placed to prevent any short-circuit from exceeding a short-circuit current rating of the primary bus 12. For example, the generators 14 are able to produce a specified short-circuit current. Additionally, the motors 18 also produce short-circuit current. Since the system 10 includes several generators 14 and motors 18, a total short-circuit current may be very high, and beyond the primary bus's 12 short-circuit current rating. However, by placing the ISCLs 26 along the primary bus 12 between the generators 14, the engineer prevents multiple generators 14 and motors 18 from cooperating in response to the short-circuit. Thus, the primary bus 12 need only be rated to handle the short-circuit current from one of the generators 14 and one of the motors 18. Of course, should the primary bus 12 be able to handle the short-circuit current from two or more generators 14 and/or motors 18, the engineer may use fewer ISCLs 26 by placing the ISCLs 26 between pairs of generators 14 and/or motors 18.

As discussed above, the ISCLs 26 may break down the primary bus 12 into several sub-buses 12a, 12b, 12c, 12d. Thus, the engineer may also locate ISCLs 26 with this in mind. For example, the engineer may decide to place the ISCLs 26 around, or in series with, large loads in an effort to minimize any impact a short-circuit associated with those loads might have on the rest of the system 10. The engineer may also place ISCLs 26 between critical and/or safety related loads and other loads that are more likely to experience a short-circuit or similar fault, thereby increasing availability of the critical and/or safety related loads.

Figure 11:
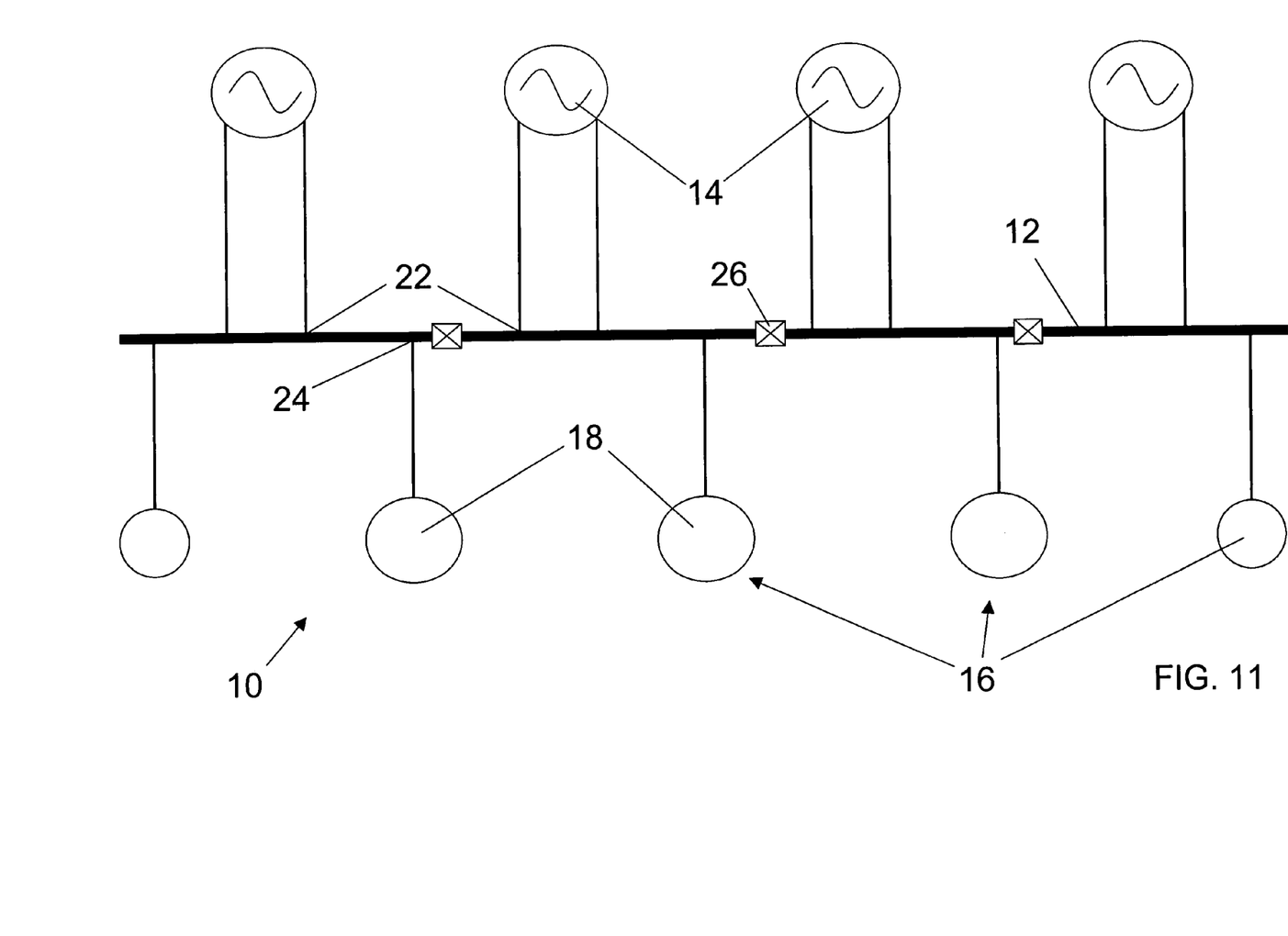
FIG. 11 is a one-line diagram of the electrical system showing the generators supplying a bus through multiple taps.

It should be noted, referring also to FIG. 11, that the generators 14 may be configured with multiple taps and each tap may be connected to a different input point 22 of the the primary bus 12. In this case, power provided by each generator 14 may be split, before that power reaches the primary bus 12. This may be especially useful where the generators 14 may be called on to provide more power than any one input point 22 of the primary bus 12 is rated to handle.

Having thus described a preferred embodiment of the invention, what is claimed as new and desired to be protected by Letters Patent includes the following:

The invention claimed is:

1. An electrical power system comprising:
   a plurality of generators;
   a plurality of loads that when summed determine a total power consumed which is provided by the generators, wherein the generators produce power at a voltage level of a largest one of the loads; and
   a bus electrically connecting each of the generators with each of the loads, wherein the bus is rated at less than the total power consumed but carries all of the total power consumed from the generators to the loads without overloading the bus.

2. The system as set forth in claim 1, wherein each generator is connected to a different point along the bus such that the total power consumed does not flow through any one point of the bus.

3. The system as set forth in claim 1, wherein each generator is connected to a different point along the bus such that the total power consumed is distributed throughout the bus without overloading the bus.

4. The system as set forth in claim 1, wherein each load is connected to a different point along the bus such that the total power consumed does not flow through any one point of the bus.

5. The system as set forth in claim 1, wherein each load is connected to a different point along the bus such that the total power consumed is distributed throughout the bus without overloading the bus.

6. The system as set forth in claim 1, wherein the bus is rated at approximately 13,800 volts and approximately 5,000 amps of operating current for a power rating of approximately 119,000,000 volt-amps under normal operations.

7. The system as set forth in claim 6, wherein the total power consumed exceeds 120,000,000 volt-amps.

8. The system as set forth in claim 6, wherein at least one of the loads requires more than 95,000,000 volt-amps.

9. The system as set forth in claim 1, wherein the bus is rated at approximately 12,500 volts and approximately 5000 amps of operating current for an approximate power rating of 107,000,000 volt-amps under normal operations.

10. The system as set forth in claim 9, wherein the total power consumed exceeds 110,000,000 volt-amps.

11. The system as set forth in claim 9, wherein at least one of the loads requires more than 95,000,000 volt-amps.

12. The system as set forth in claim 1, wherein the bus is rated at approximately 13,800 volts and approximately 3150 amps of operating current for an approximate power rating of 75,300,000 volt-amps under normal operations.

13. The system as set forth in claim 12, wherein the total power consumed exceeds 76,000,000 volt-amps.

14. The system as set forth in claim 12, wherein at least one of the loads requires more than 76,000,000 volt-amps.

15. The system as set forth in claim 12, further including a secondary bus such that the total power consumed exceeds 100,000,000 volt-amps.

16. The system as set forth in claim 1, wherein the bus is rated at approximately 12,500 volts and approximately 3150 amps of operating current for an approximate power rating of 68,000,000 volt-amps under normal operations.

17. The system as set forth in claim 16, wherein the total power consumed exceeds 70,000,000 volt-amps.

18. The system as set forth in claim 16, wherein at least one of the loads requires more than 70,000,000 volt-amps.

19. The system as set forth in claim 16, further including a secondary bus such that the total power consumed exceeds 100,000,000 volt-amps.

20. The system as set forth in claim 1, wherein the bus is rated at more than 2000 volts and more than 1000 amps, thereby determining a power rating.

21. An electrical power system comprising:
   a plurality of generators;
   a plurality of loads that when summed determine a total power consumed which is provided by the generators; and
   a bus electrically connecting each of the generators with each of the loads, wherein the bus is rated at less than the total power consumed but carries all of the total power consumed from the generators to the loads without overloading the bus, and wherein the bus is rated at more than 2000 volts and more than 1000 amps, thereby determining a power rating,
   wherein at least one of the loads requires more than the power rating.

22. The system as set forth in claim 1, wherein the bus includes a current limiter device electrically connected between the generators, thereby allowing the generators to share the loads while preventing a short circuit current rating of the bus from being exceeded.

23. The system as set forth in claim 1, wherein the bus includes a current limiter device electrically connected between the loads, thereby allowing the generators to share the loads while preventing a short circuit current rating of the bus from being exceeded.

24. The system as set forth in claim 1, wherein the bus is rated at the voltage level of the largest one of the loads.

25. The system as set forth in claim 1, wherein each generator is connected directly to the bus without a transformer therebetween.

26. The system as set forth in claim 1, wherein a largest one of the loads is connected directly to the bus without a transformer therebetween.

27. A liquefied natural gas (LNG) facility employing one or more refrigerants to cool a natural gas stream, said LNG facility comprising:
- a plurality of compressors to compress said one or more refrigerants;
- a plurality of electric motors to drive the compressors, wherein each motor contributes to a total power consumed and consumes power at a voltage level, wherein the voltage level is set at the voltage requirement of a largest one of the motors;
- a plurality of generators to power the motors, each producing power at the voltage level; and
- a bus rated at the voltage level to carry all of the total power consumed from the generators to the motors without overloading the bus,
- wherein each generator and motor is substantially directly connected to a different point along the bus such that the total power consumed does not flow through any one point of the bus and at least one of the motors requires more than the power rating of the bus.

28. The LNG facility as set forth in claim 27, wherein the voltage level exceeds 2000 volts.

29. The LNG facility as set forth in claim 27, further including a plurality of turbines fired by the natural gas to drive the generators.

30. The LNG facility as set forth in claim 27, further including a plurality of current limiters distributed along the bus, thereby allowing the generators to cooperate in providing the total power consumed while preventing a short circuit current rating of the bus from being exceeded.

31. A method of designing an electrical power system to supply power to electric motors, the method comprising the steps of:
- (a) summing the motors' power requirements, thereby calculating a total power consumed;
- (b) calculating a quantity of generators, each having a given generation capacity, to adequately supply the motors' power requirements, wherein the generators produce power at a voltage level of a largest one of the motors;
- (c) adding one to the quantity, thereby accommodating all of the motors if one of the generators should cease supplying power to the system;
- (d) selecting a bus to electrically connect each of the generators with each of the loads, wherein the bus is rated at less than the total power consumed but carries all of the total power consumed from the generators to the motors without overloading the bus; and
- (e) determining where each generator and each motor should be connected to the bus in order to prevent the bus from becoming over-loaded.

32. The method as set forth in claim 31, wherein step (e) comprises using Kirchhoff's current law.

33. The method as set forth in claim 31, further including the step of determining where each of a plurality of current limiters should be connected to the bus in order to prevent the bus from becoming over-loaded during a short-circuit.

* * * * *